(12) United States Patent
Aoki

(10) Patent No.: US 9,365,362 B2
(45) Date of Patent: Jun. 14, 2016

(54) CONVEYER DEVICE

(71) Applicant: BROTHER KOGYO KABUSHIKI KAISHA, Nagoya-shi, Aichi-ken (JP)

(72) Inventor: Hirotaka Aoki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/040,706

(22) Filed: Sep. 29, 2013

(65) Prior Publication Data

US 2014/0168679 A1    Jun. 19, 2014

(30) Foreign Application Priority Data

Dec. 14, 2012  (JP) .................. 2012-273767

(51) Int. Cl.
*B65G 47/64*    (2006.01)
*H04N 1/00*    (2006.01)
*B41J 11/00*    (2006.01)

(52) U.S. Cl.
CPC ............. *B65G 47/647* (2013.01); *B41J 11/006* (2013.01); *H04N 1/00599* (2013.01)

(58) Field of Classification Search
USPC ....................................................... 358/1.12
See application file for complete search history.

(56) References Cited

U.S. PATENT DOCUMENTS

| | | | |
|---|---|---|---|
| 5,752,134 A | 5/1998 | Hazama et al. | |
| 7,819,394 B2 | 10/2010 | Shiohara et al. | |
| 8,210,517 B2 | 7/2012 | Osakabe et al. | |
| 8,561,986 B2 | 10/2013 | Kozaki et al. | |
| RE44,946 E | 6/2014 | Shiohara et al. | |
| 2009/0194931 A1* | 8/2009 | Shiohara et al. | ............... 271/8.1 |
| 2010/0078872 A1 | 4/2010 | Asada et al. | |
| 2010/0166473 A1* | 7/2010 | Asada et al. | .................. 399/405 |
| 2011/0227274 A1* | 9/2011 | Nishikata et al. | .......... 271/10.12 |
| 2013/0249161 A1 | 9/2013 | Uchino | |

FOREIGN PATENT DOCUMENTS

| | | |
|---|---|---|
| CN | 101472033 A | 7/2009 |
| CN | 101498908 A | 8/2009 |
| CN | 102730466 A | 10/2012 |

(Continued)

OTHER PUBLICATIONS

Notification of Reasons of Rejection issued in related JP application No. 2012-273767, Jan. 26, 2016.

(Continued)

*Primary Examiner* — Fan Zhang
(74) *Attorney, Agent, or Firm* — Merchant & Gould P.C.

(57) ABSTRACT

A conveyer device, including a body; a first path member forming a part of conveyer path with a curve; and a second path member arranged on an inner side of the curve of the conveyer path and forming a part of the conveyer path, is provided. The first path member is movable between a first position forming the conveyer path in conjunction with the second path member and a second position separated farther from second path member than the first position. The body includes a first supporting part supporting the first path member at a widthwise end of the first path member and the second supporting part supporting the first path member at a widthwise inner-side position along the widthwise direction with respect to the first supporting part. The second supporting part supports the first path member from a side opposite from the conveyer path.

11 Claims, 10 Drawing Sheets

(56) References Cited

FOREIGN PATENT DOCUMENTS

| | | |
|---|---|---|
| JP | 9-319286 A | 12/1997 |
| JP | 2009-179447 A | 8/2009 |
| JP | 2010-083626 A | 4/2010 |
| JP | 2010-285253 A | 12/2010 |
| JP | 2012-001325 A | 1/2012 |

OTHER PUBLICATIONS

Notification of First Office Action issued in related Chinese patent application 201310461978.3, Mar. 2, 2016.

* cited by examiner

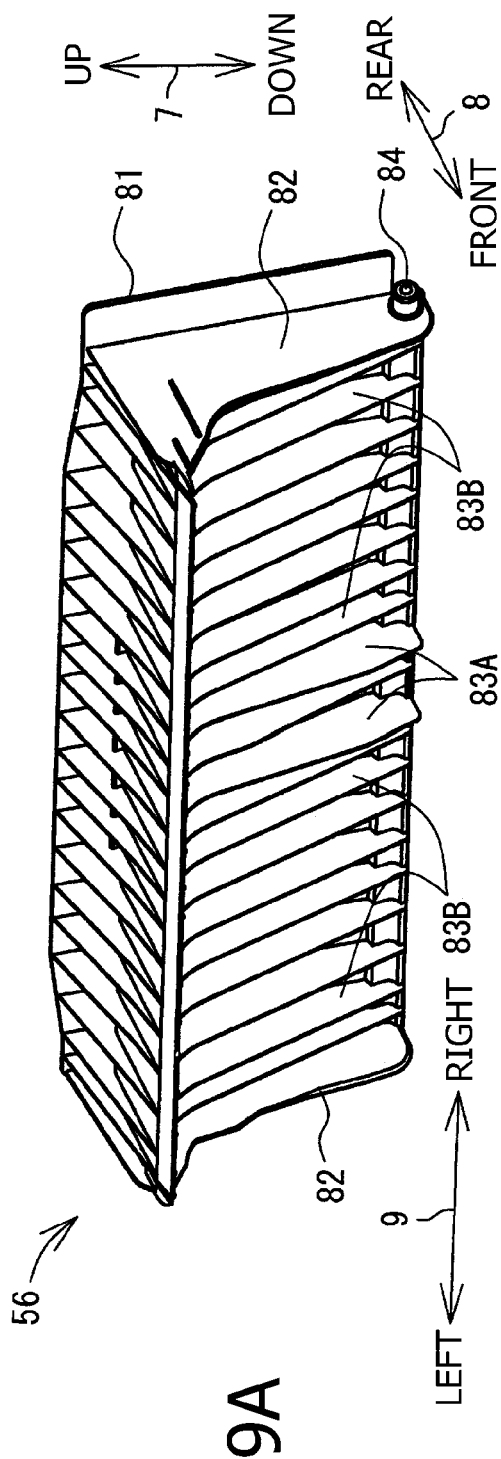
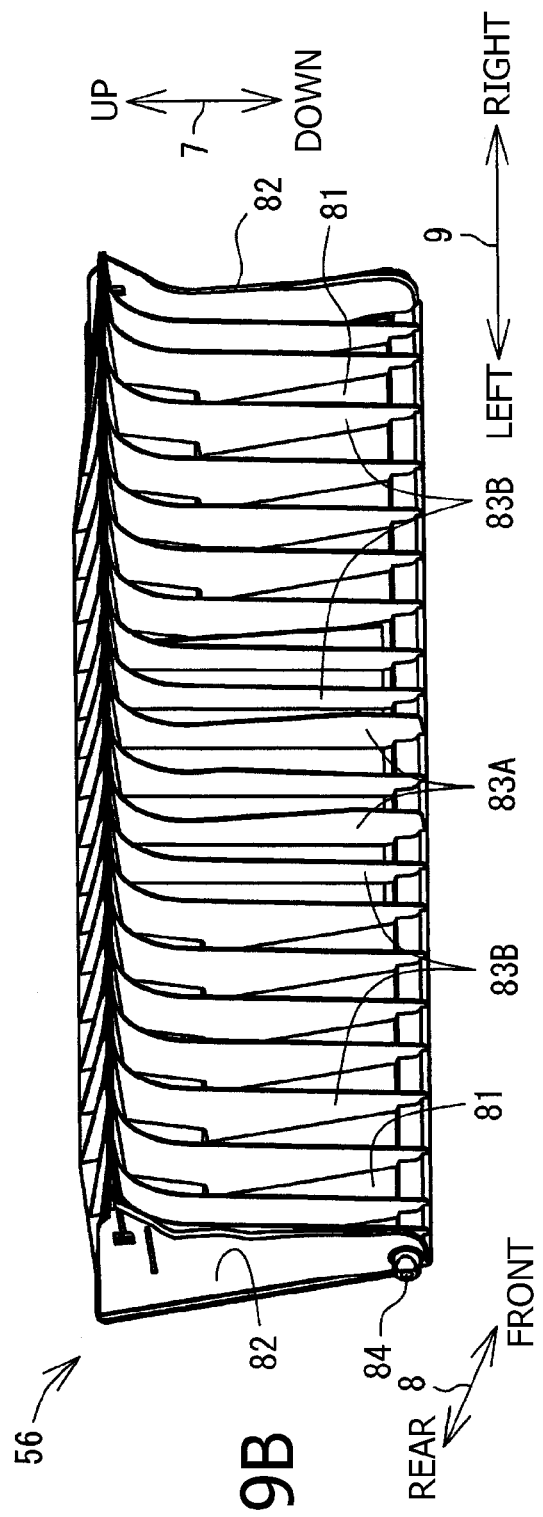

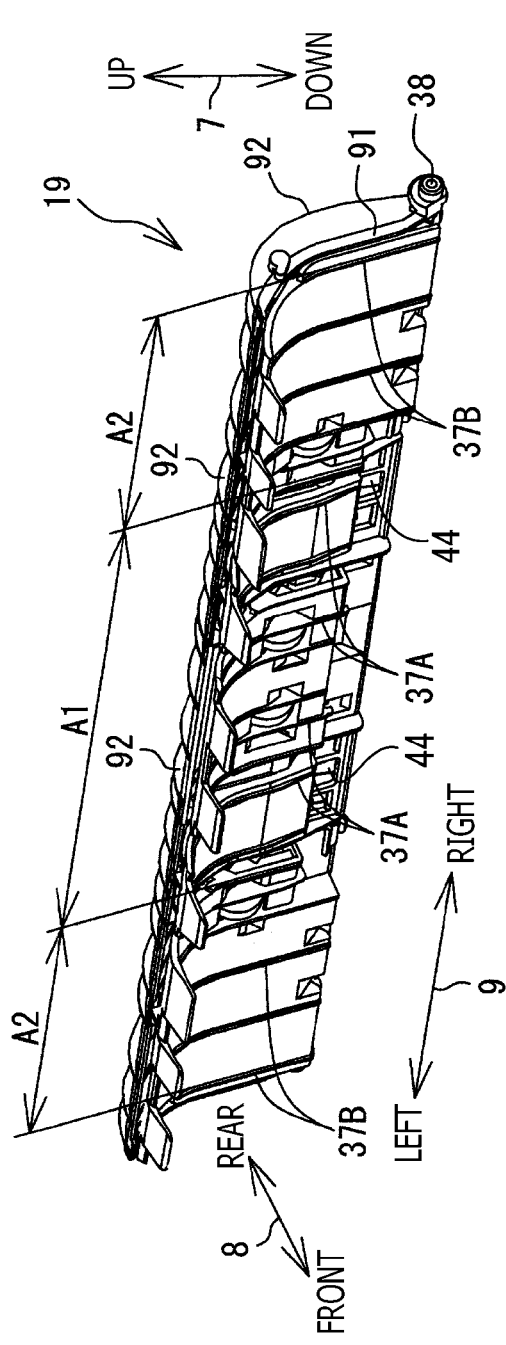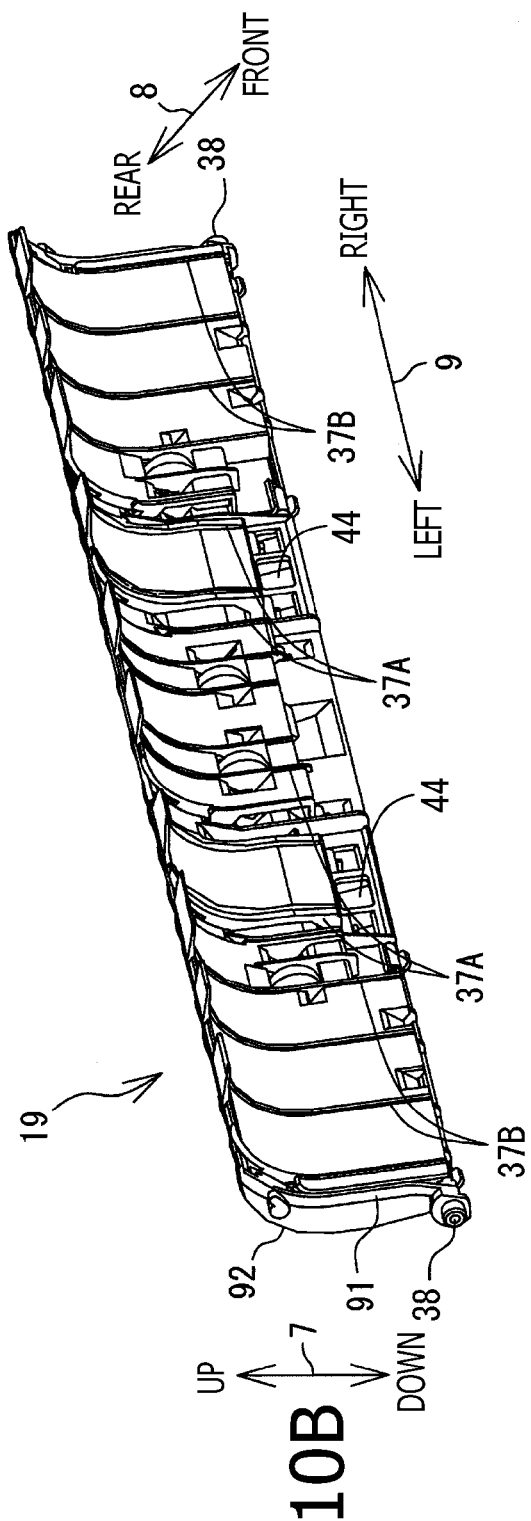
FIG. 10A
FIG. 10B

CONVEYER DEVICE

CROSS REFERENCE TO RELATED APPLICATION

This application claims priority from Japanese Patent Application No. 2012-273767, filed on Dec. 14, 2012, the entire subject matter of which is incorporated herein by reference.

BACKGROUND

1. Technical Field

An aspect of the present invention relates to a conveyer device capable of conveying a sheet along a conveyer path.

2. Related Art

A conveyer device for conveying a sheet along a conveyer path formed inside is known. The conveyer device may include, for example, an image recording apparatus such as a printer and a multifunction peripheral device (MFP) In such an image recording apparatus, in consideration of a case where the sheet is jammed in the conveyer path, the image recording apparatus may be enabled to expose a part of the conveyer path so that the jammed sheet may be removed from the conveyer path through the exposed part. In this regard, one of path components constituting the conveyer path may be rotatable so that the part of the conveyer path can be exposed by rotating the path component.

SUMMARY

In the image recording apparatus with the rotatable path component forming the conveyer path, however, the path component rotatably attached to a body of the image recording apparatus may be more easily deformable when being forced compared to a path component immovably attached to the body of the image recording apparatus. Therefore, when the sheet being conveyed along the conveyer path is urged against the path component, the path component being urged by the sheet may be bowed. In particular, when the sheet being conveyed along the conveyer path is a thicker type of paper, such as gloss paper or a postcard, the urging force by the sheet to urge the path component may be greater, and it may even be more likely that the path component is deformed.

Once the path component is deformed, it may be likely that the sheet is not correctly conveyed along the conveyer path and may be jammed therein.

The present invention is advantageous in that a sheet conveyer, in which the path component forming the conveyer path is rotatable, and in which the sheet can be correctly conveyed along the conveyer path, is provided.

According to an aspect of the present invention, a conveyer device is provided. The conveyer device includes a body; a first path member supported by the body, the first path member forming a part of conveyer path, which is curved at least partially, and in which a sheet is conveyed from an upstream toward a downstream according to a conveying flow; and a second path member supported by the body, the second path member being arranged on an inner side of a curve of the conveyer path to face the first path member, the second path member forming a part of the conveyer path. The first path member is movable between a first position, in which the first path member forms the conveyer path in conjunction with the second path member, and a second position, in which the first path member is separated farther from second path member than the first path member being in the first position. The body comprises a first supporting part and a second supporting part, the first supporting part configured to support the first path member at a widthwise end of the first path member along a widthwise direction, which intersects with the conveying flow of the sheet being conveyed along the conveyer path, and the second supporting part configured to support the first path member at a widthwise inner-side position along the widthwise direction with respect to the first supporting part. The second supporting part is configured to support the first path member from a side opposite from the conveyer path.

According to another aspect of the present invention, an image recording apparatus including a body, a conveyer device, and an image recording unit is provided. The conveyer device includes a first path member supported by the body, the first path member forming a part of conveyer path, which is curved at least partially and in which a sheet is conveyed from an upstream toward a downstream according to a conveying flow; and a second path member supported by the body, the second path member being arranged on an inner side of a curve of the conveyer path to face the first path member, the second path member forming a part of the conveyer path. The image recording unit is configured to record an image on the sheet being conveyed through the conveyer path. The first path member is movable between a first position, in which the first path member forms the conveyer path in conjunction with the second path member, and a second position, in which the first path member is separated farther from second path member than the first path member being in the first position. The body comprises a first supporting part and a second supporting part, the first supporting part configured to support the first path member at a widthwise end of the first path member along a widthwise direction, which intersects with the conveying flow of the sheet being conveyed along the conveyer path, and the second supporting part configured to support the first path member at a widthwise inner-side position along the widthwise direction with respect to the first supporting part. The second supporting part is configured to support the first path member from a side opposite from the conveyer path.

BRIEF DESCRIPTION OF THE ACCOMPANYING DRAWINGS

FIGS. 9A-9B are perspective views of the third path member 56 in the MFP 10 according to the embodiment of the present invention.

FIGS. 10A-10B are perspective views of the first path member 19 in the MFP 10 according to the embodiment of the present invention.

DETAILED DESCRIPTION

Figure 1:
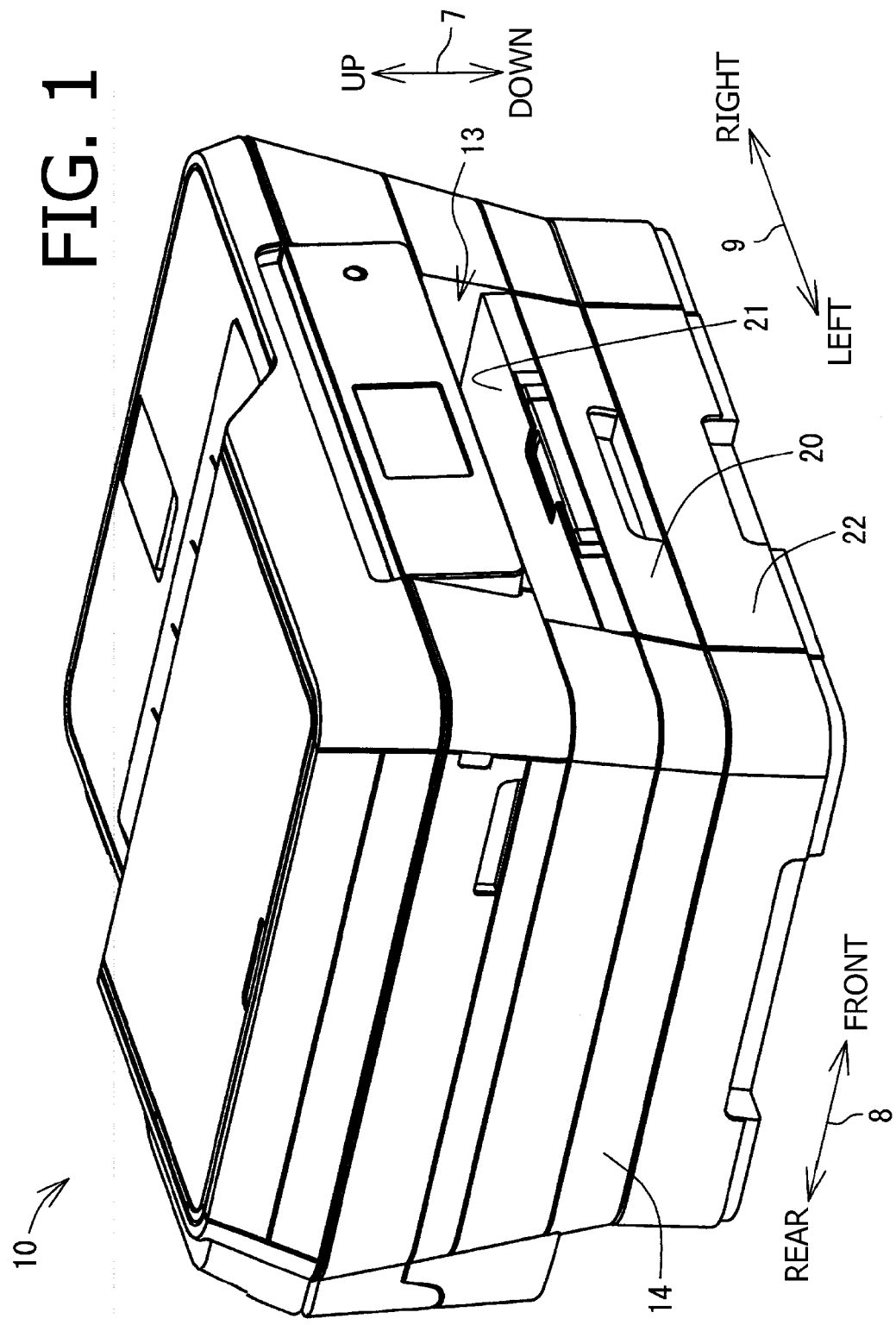
FIG. 1 is a perspective view of a multifunction peripheral device (MFP) 10 according to an embodiment of the present invention showing front, left and upper sides of the MFP 10.

Hereinafter an embodiment of the present invention will be described with reference to the accompanying drawings. It is noted that various connections are set forth between elements in the following description. These connections in general, and unless specified otherwise, may be direct or indirect, and this specification is not intended to be limiting in this respect. It is noted in the following description that a term "flow" refers to one-way movement from one point toward another along a line, including a straight line and a curved line, and a term "direction" refers to a line, including a straight line and a curved line, which extends between two points. In the following description, a vertical direction 7 is defined with reference to an up-to-down or down-to-up direction for the MFP 10 in an ordinarily usable posture (see FIG. 1). In other words, the up-to-down or down-to-up direction in FIG. 1 is the vertical direction 7. Further, other directions concerning the MFP 10 will be referred to based on the ordinarily usable posture of the MFP 10: a viewer's lower-right side in FIG. 1, on which an opening 13 is formed, is defined to be a front side of the MIT 10, and a side opposite from the front side, i.e., a viewer's upper-left side, is defined as a rear side of the MFP 10. A front-to-rear or rear-to-front direction is defined as a direction of depth and may be referred to as a front-rear direction 8. A lower-left side in FIG. 1, which comes on the user's left-hand side with respect to the MFP 10 when the user faces the front side, is referred to as a left side. A side opposite from the left, which is on the viewer's upper-right side, is referred to as a right side. A right-to-left or left-to-right direction of the MFP 10 may also be referred to as a right-left direction 9 or a widthwise direction 9. The directions shown in FIGS. 2-10A, 10B correspond to those indicated by the arrows appearing in FIG. 1.

[Overall Configuration of the MFP 10]

As depicted in FIG. 1, the MFP 10 has an overall shape of a six-sided rectangular box and includes a housing 14, which forms an external covering of a body of the MFP 10. The MFP 10 is equipped with a plurality of functions including a facsimile function and a printing function. While the printing function may be a function to record an image on at least one of two sides of a recording sheet 12, according to the present embodiment, the MFP 10 is capable of printing an image on one side of the recording sheet 12.

The opening 13 is formed on the front side of the housing 14, and a space is formed in a rearward position from the opening 13 A first feeder tray 20 and a second feeder tray 22, which will be described later in detail, can be inserted in and drawn out of the space through the opening 13. In other words, the first feeder tray 20 and the second feeder tray 22 are attachable to the housing 14 through the opening 13.

Figure 2:
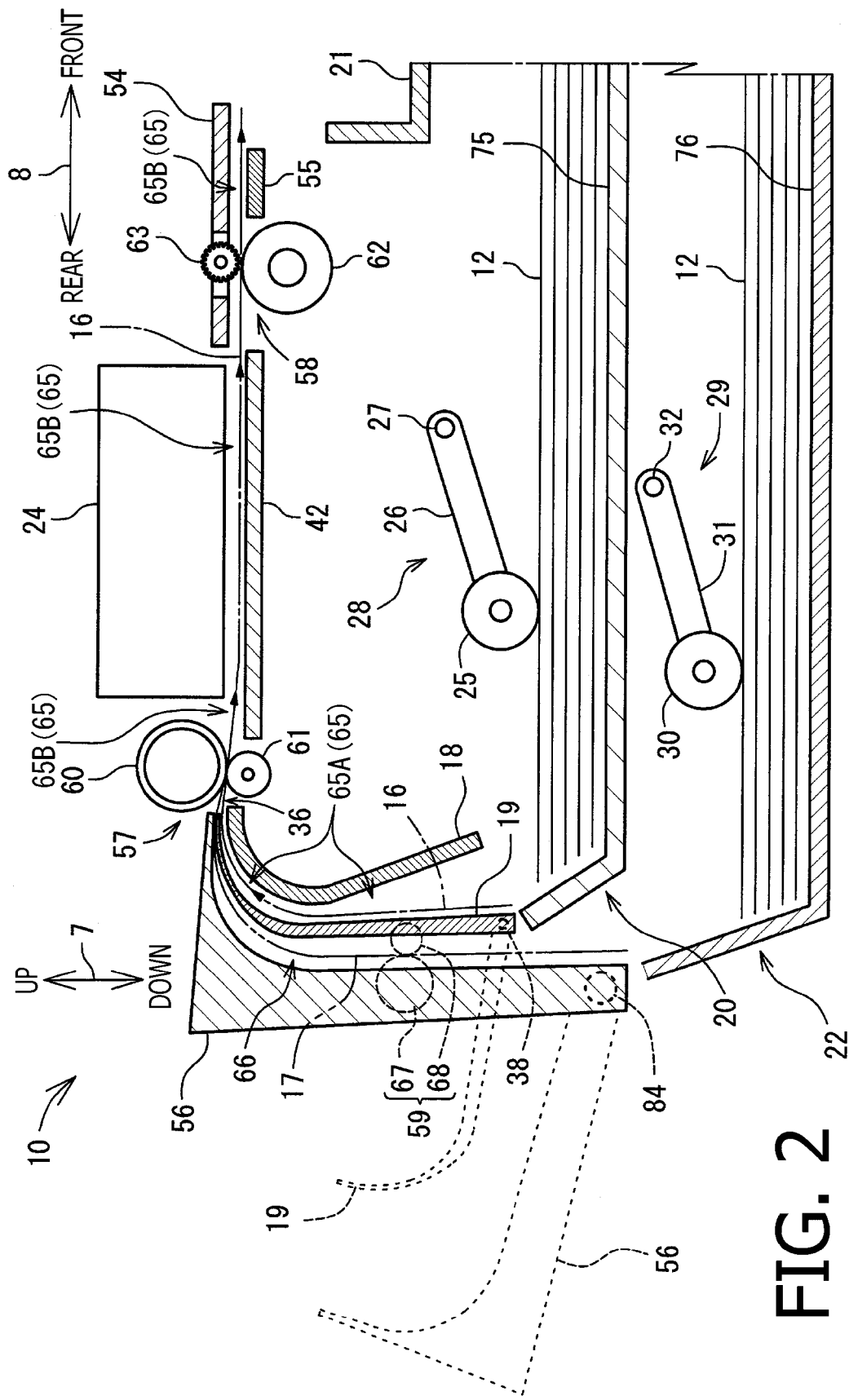
FIG. 2 is a cross-sectional side view of a rear part of the MFP 10 according to the embodiment of the present invention.

As depicted in FIG. 2, inside the housing 14, paired conveyer rollers 57, paired ejection rollers 58, a recording unit 24, the first feeder tray 20, the second feeder tray 22, an ejection tray 21, a first feeder unit 28 and a second feeder unit 29 are disposed.

The first feeder tray 20 and the second feeder tray 22 are, when attached to the housing 14, arranged in lower positions with respect to the recording unit 24. When the first feeder tray 20 is attached to the housing 14, the recording sheet 12 placed in the first feeder tray 20 can be fed to the recording unit 24 through a conveyer path 65. When the second feeder tray 22 is attached to the housing 14, the recording sheet 12 placed in the second feeder tray 22 can be fed to the recording unit 24 through an auxiliary conveyer path 66.

Each of the first and second feeder trays 20, 22 is formed in an approximate shape of a top-open flat box. The first feeder tray 20 includes a bottom plate 75, on which a plurality of sheets 12 can be stacked. The second feeder tray 22 includes a bottom plate 76, on which a plurality of sheets 12 can be stacked. An area above a front part of the first feeder tray 20 is covered with the ejection tray 21. The ejection tray 21 is slidable along the front-rear direction 8 integrally with the first feeder tray 20.

The recording sheet 12 placed on the bottom plate 75 is fed rearward by the first feeder unit 28 to be carried to the conveyer path 65 and conveyed in the conveyer path 65 along a conveying flow 16, which intersects with the widthwise direction 9. The conveying flow 16 is indicated by a dash-and-dot line shown in FIG. 2. When a leading edge of the recording sheet 12 being conveyed along the conveying flow 16 reaches the paired conveyer rollers 57, the recording sheet 12 is conveyed by the pared conveyer rollers 57 further in the conveyer path 65 along the conveying flow 16 toward the recording unit 24. When the recording sheet 12 reaches a position substantially straight below the recording unit 24, an image is recorded on a surface of the recording sheet 12 facing the recording unit 24 by the recording unit 24. The recording sheet 12 with the recorded image on the surface is conveyed further in the conveyer path 65 along the conveying flow by the paired ejection rollers 58 and ejected in the ejection tray 21.

The recording sheet 12 placed on the bottom plate 76 is fed rearward by the second feeder unit 29 to be carried to the auxiliary conveyer path 66 and conveyed in the auxiliary conveyer path 66 along a conveying flow 17, which intersects with the widthwise direction 9. The conveying flow 17 is indicated by a dash-and-double-dot line shown in FIG. 2. The auxiliary conveyer path 66 merges with the conveyer path 65 at a merging point 36. The merging point 36 is in a position, which is on an upstream side with respect to the paired conveyer rollers 57 according to the conveyer flow 16 and in proximity to the paired conveyer rollers 57.

[Conveyer Path 65]

The conveyer path 65 is a path to guide the recording sheet 12. As depicted in FIG. 2, the conveyer path 65 extends from a rear end of the first feeder tray 20 attached to the housing 14 to a position above a part of the ejection tray 21 through the paired conveyer rollers 57 and partly along the recording unit 24. The conveyer path 65 includes a curved path 65A and an ejection path 65B.

The curved path 654 is formed to curve and is arranged to have a downstream part thereof, according to the conveying flow 16, in an upper position with respect to an upstream part thereof. In particular, the curved path 65A extends to guide the recording sheet 12, which is conveyed rearward from the feeder tray 20 by the first feeder unit 28, from a lower position to an upper position to make a U-turn thereat. In other words, the curved path 65A is curved in a shape to invert the recording sheet 12 fed to the curved path 65A upside-down from the posture of being laid in the first feeder tray 20. Thereby, the recording sheet 12 placed on the bottom plate 75 in the first feeder tray 20 is conveyed from the lower position to the upper position along the curved path 65A to make the U-turn and conveyed to the paired conveyer rollers 57. The curved path 65A includes a first path member 19 and a second path member 18, which will be described later in detail.

The ejection path 65B is a path to guide the recording sheet 12. The ejection path 65B is continuously connected with the downstream end of the curved path 65A according to the conveying flow 16 at the paired conveyer rollers 57 and extends to the position above the ejection tray 21. The ejection path 65B extends linearly substantially along the front-rear direction 8. Thereby, the recording sheet 12 reaching the paired conveyer rollers 57 is conveyed by the paired conveyer rollers 57 frontward in the ejection path 65B and ejected in the ejection tray 21.

The ejection path 65B includes a part, which is formed with an upper path member 54 and a lower path member 55, and a part, which is formed with the recording unit 24 and a platen 42 to support the recording sheet 12.

[Auxiliary Conveyer Path 66]

The auxiliary conveyer path 66 is a path to guide the recording sheet 12. As depicted in FIG. 2, the auxiliary conveyer path 66 extends from a rear end of the second feeder tray 22 attached to the housing 14 to the merging point 36. The auxiliary conveyer path 66 includes the first path member 19 and a third path member 56, which will be described later in detail.

The auxiliary conveyer path 66 is formed in a rearward position with respect to the curved path 65A. In particular, the auxiliary conveyer path 66 is formed on an outer side of a curve of the curved path 65A. According to the present embodiment, the auxiliary conveyer path 66 includes a linear part extending substantially along the vertical direction 7 and a curved part, which is curved and continuously connected with a downstream end of the linear part along the conveying flow 17. The curved part is formed to curve along the curve of the curved path 65A. However, the auxiliary conveyer path 66 may not necessarily have the liner part but may be termed to curve entirely.

Thus, the auxiliary conveyer path 66 is formed to curve and is arranged to have the downstream end thereof, according to the conveying flow 17, in an upper position with respect to an upstream end thereof. In other words, the auxiliary conveyer path 66 is, similarly to the curved path 65A, curved in a shape to invert the recording sheet 12 fed to the auxiliary conveyer path 66 upside-down from the posture of being laid in the second feeder tray 22. Thereby, the recording sheet 12 placed on the bottom plate 76 in the second feeder tray 22 is conveyed from the lower position to the upper position along the auxiliary conveyer path 66 to make a U-turn and conveyed to the curved path 65A through the merging point 36 to reach the paired conveyer rollers 57.

[Paired Conveyer Rollers 57 and Paired Ejection Rollers 58]

As depicted in FIG. 2, in a position on a downstream side with respect to the curved path 65A and on an upstream side with respect to the ejection path 65B along the conveying flow 16, the paired conveyer rollers 57 are disposed. The paired conveyer rollers 57 include a conveyer roller 60 and a pinch roller 61. Meanwhile, on the ejection path 65B, the paired ejection rollers 58 are disposed. The paired ejection rollers 58 include an ejection roller 62 and a spur 63.

The paired rollers 57, 58 are disposed to nip the recording sheet 12. The conveyer roller 60 and the ejection roller 62 are rotated in one of a normal rotating direction and a reverse rotating direction by driving force provided from a motor (not shown). The conveyer roller 60 and the ejection roller 62, to which the driving force is applied, rotate in one of the normal and reverse rotating directions to convey the recording sheet 12 in the conveying flow 16. The recording sheet 12 includes the recording sheet 12 placed on the bottom plate 75 to be conveyed to the conveyer path 65 by the first feeder unit 25 and the recording sheet 12 placed on the bottom plate 76 to be conveyed to the auxiliary conveyer path 66. Thus, by rotating in the one of the normal and reverse rotating directions, the conveyer roller 60 and the ejection roller 62 convey the recording sheet \2 conveyed from one of the feeder trays 20, 22 along the conveying flow 16.

Further, the conveyer roller 60 and the ejection roller 62, to which the driving force is applied, can rotate in the other one of the normal and reverse rotating directions to convey the recording sheet 12 along a reverse-conveying flow, which is opposite from the conveying flow 16. Thus, by rotating in the other one of the normal and reverse rotating directions, the conveyer roller 60 and the ejection roller 62 can convey the recording sheet 12 conveyed from one of the feeder trays 20, 22 along the reverse-conveying flow.

Meanwhile, the conveyer roller 60 can perform a registration control to correct skew of the recording sheet 12 by being rotated in the reverse rotating direction, which is opposite from the rotation to convey the recording sheet 12 in the conveying flow 16. More specifically, the conveyer roller 60 is rotated in the other of normal and reverse rotating directions for a predetermined length of time while the leading edge of the recording sheet 12 according to the conveying flow is in contact with the conveyer roller 60. Thereby, skew of the recording sheet 12 is corrected. After the predetermined length of time, the conveyer roller 60 is rotated in the rotating direction to convey the sheet 12 along the conveying flow 16. Thus, the skew-corrected recording sheet 12 is correctly conveyed along the conveying flow 16.

[Recording Unit 24]

As depicted in FIG. 2, the recording unit 24 is disposed in a position between the paired conveyer rollers 57 and the paired ejection rollers 58 on the ejection path 65B. According to the present embodiment, the recording unit 24 records an image on the recording sheet 12 conveyed in the ejection path 65B in an inkjet recording method. However, the method to record the image on the recording sheet 12 by the recording unit 24 may not necessarily be the inkjet recording method but may be other method such as, for example, an electrophotographic method.

[First Feeder Unit 28 and Second Feeder Unit 29]

As depicted in FIG. 2, in an upper position with respect to the first feeder tray 20 attached to the housing 14, the first feeder unit 28 is disposed. The first feeder unit 28 includes a first feed roller 25, a first arm 26 and a first shaft 27.

The first feed roller 25 is rotatably supported by the first arm 26 at a tip end thereof. The first arm 26 is rotatably supported by a first shaft 27, which is supported by the housing 14. The first arm 26 is supported by the first shaft 27 at a front end thereof and extends rearward. The first arm 26 is urged downward by weight thereof and/or resilient force provided by, for example, a spring. Therefore, when no recording sheet 12 is placed on the bottom plate 75 in the first feeder tray 20, the first feed roller 25 contacts the bottom plate 75. When one or more recording sheets 12 are placed on the bottom plate 75, the first feed roller contacts a topmost one of the recording sheets 12 placed on the bottom plate 75.

The first feed roller 25 is rotated by driving force provided from a motor (not shown). The motor to drive the first feed roller 25 may or may not be the same motor as the motor to drive the conveyer roller 60 and the ejection roller 62. The first feed roller 25 being rotated picks up the recording sheet 12 from the bottom plate 75 and conveys rearward. Thus, the recording sheet 12 is conveyed to the curved path 65A.

As depicted in FIG. 2, in an upper position with respect to the second feeder tray 22 attached to the housing 14, the second feeder unit 29 is disposed. The second feeder unit 29 includes a second feed roller 30, a second arm 31 and a second shaft 32. The second feed roller 30 is rotated by driving force provided from a motor (not shown). The second feed roller 30 being rotated picks up the recording sheet 12 from the bottom plate 76 and conveys to the auxiliary conveyer path 66. The second feed roller 30, the second arm 31 and the second shaft 32 are in similar structures as the first feed roller 25, the first arm 23 and the first shaft 27 respectively; therefore, description of those is herein omitted.

[First Path Member 19 and Second Path Member 18]

Figure 7:
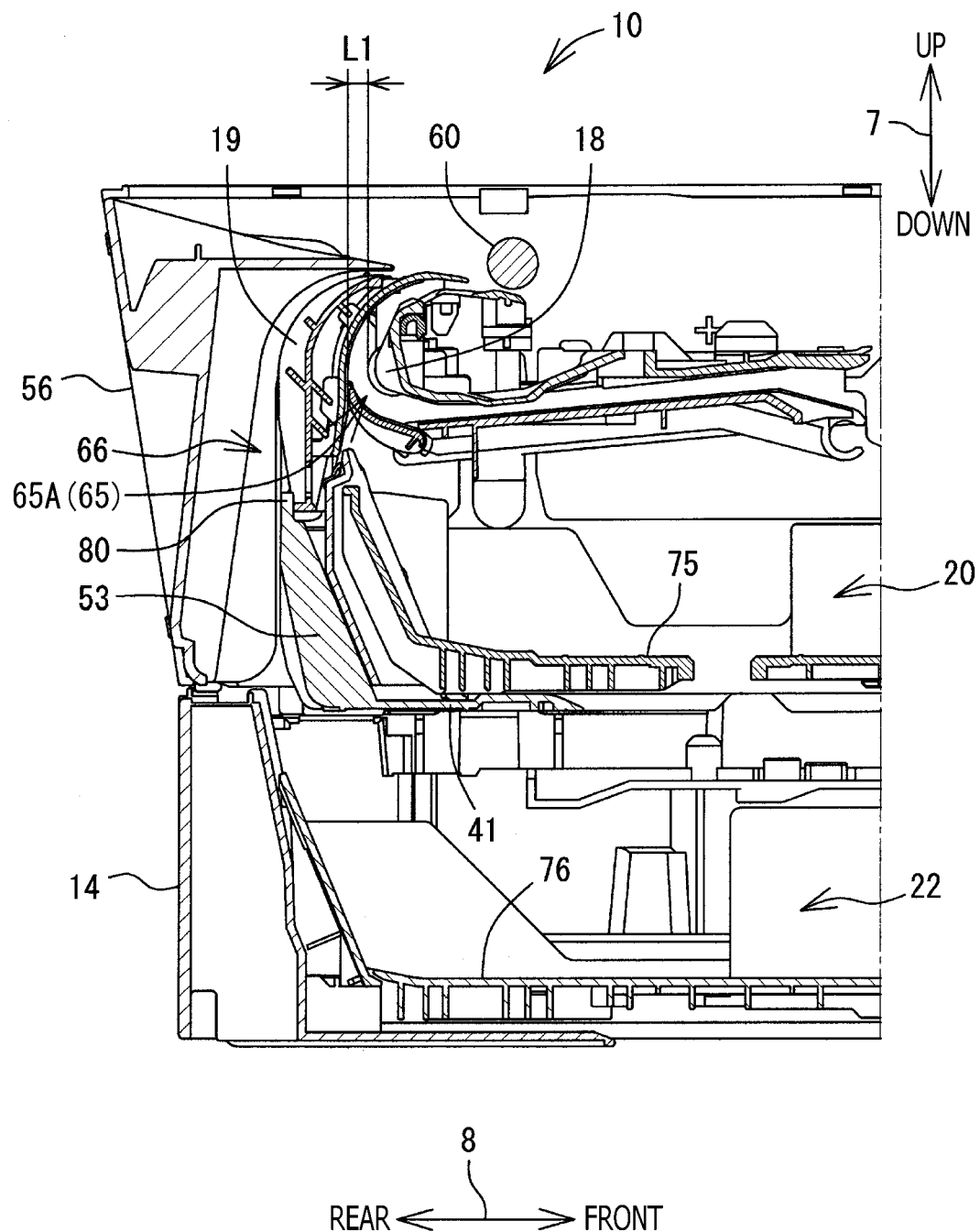
FIG. 7 is a cross-sectional view of the MFP 10 according to the embodiment of the present invention at a line VII-VII shown in FIG. 6.
Figure 8:
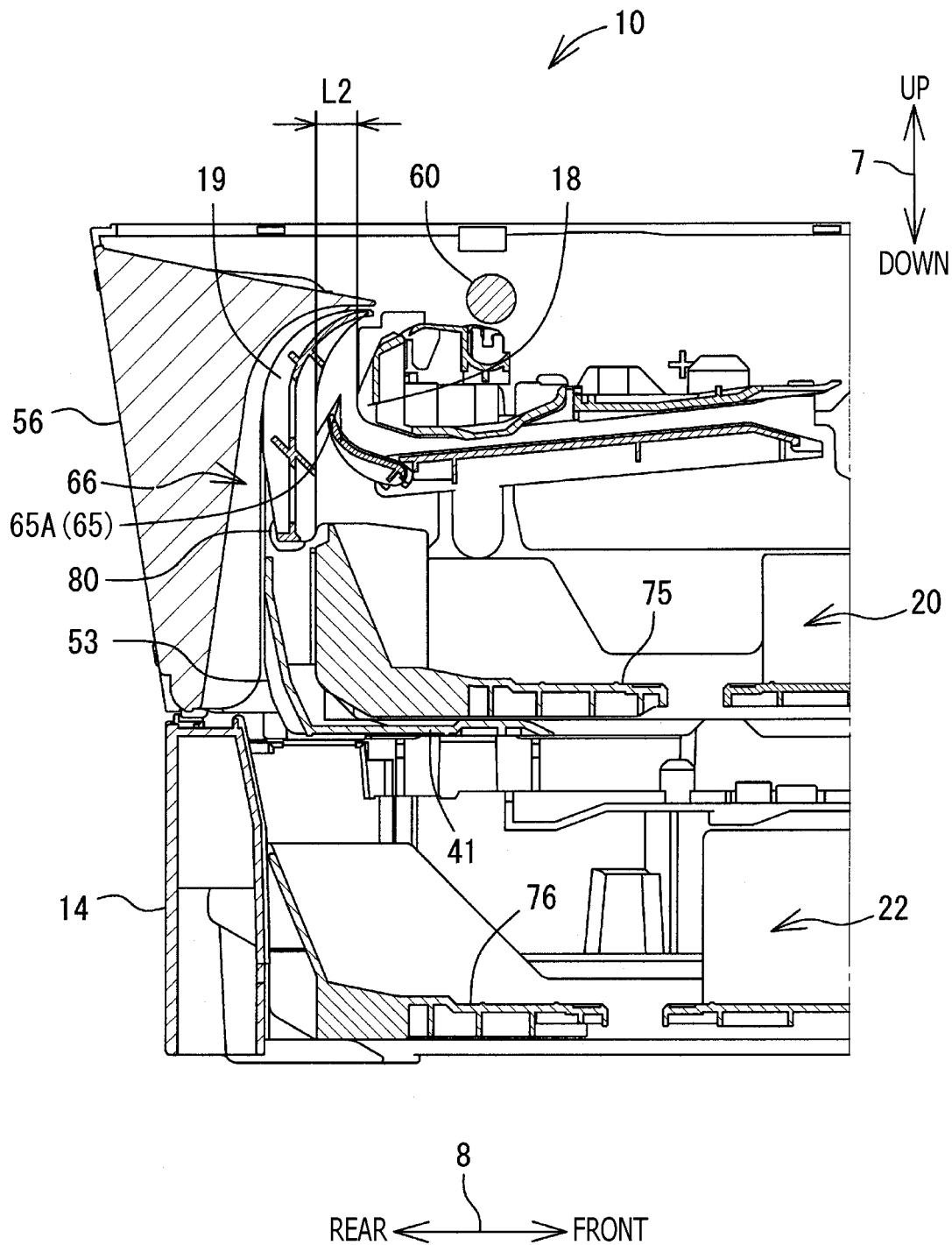
FIG. 8 is a cross-sectional view of the MFP 10 according to the embodiment of the present invention at a line shown in FIG. 6.

As depicted in FIGS. 2, 7 and 8, the first path member 19 is arranged inside the housing 14 to extend to be longer along the vertical direction 7 and the widthwise direction 9 than the front-rear direction 8 (see FIG. 4) in a rearward position with respect to the second path member 18 along the front-rear direction 8 to face the second path member 18. In other words, when the first path member 19 is disposed inside the housing 14, the first path member 19 is longer in a height and a width thereof than a depth thereof, and the first path member 18 is disposed in an outer-side position with respect to the second path member 18 along the front-rear direction 8. The first path member 19 is rotatably supported by a frame 39 (see FIGS. 4 and 5), which constitutes a part of the housing 14. Thus, the first path member 19 is supported by the housing 14 at the position to face the second path member 18. Rotatable configuration of the first path member 19 will be described later in detail.

As depicted in FIGS. 10A-10B, the first path member 19 includes a base 91, a plurality of ribs 37 protruding frontward from a front face of the base 91, a plurality of ribs 92 protruding rearward from a rear face of the base 91, and paired protrusions 38 protruding from widthwise ends of the base 91 along the widthwise direction 9. The plurality of ribs 37 are configured to contact the recording sheet 12 being conveyed in the curved path 65A to guide the recording sheet 12 to the recording unit 24. The plurality of ribs 92 are configured to contact the recording sheet 12 being conveyed in the auxiliary conveyer path 66 to guide the recording sheet 12 to the recording unit 24.

The plurality of ribs 37 are formed to be spaced apart from one another along the widthwise direction 9. A protruded edge of each rib 37 extends along the conveying flow 16. In other words, an upstream part of the protruded edge of each rib 37 according to the conveying flow 16 extends substantially along the vertical direction 7, while a downstream part of the protruded edge of each rib 37 according to the conveying flow 16 is curved frontward. The ribs 92 will be described later in detail.

As depicted in FIGS. 2, 7 and 8, the second path member 18 is disposed in a frontward position with respect to the first path member 19, i.e., on an inner side of the curve of the first path member 19, to face the first path member 19. A rear face of the second path member 18, which faces the first path member 19, extends alone the conveying direction 16 similarly to the protruded edges of the plurality of ribs 37 in the first path member 19. The second path member 18 is supported by a frame (not shown), which constitutes a part of the housing 14.

A virtual plane spreading on the protruded edges of the plurality of ribs 37 of the first path member 19 defines an outline of the curve of the curved path 65A on an outer side, and the rear face of the second path member 18 defines an outline of the curve of the curved path 65A on an inner side. In other words, the first path member 19, in conjunction with the second path member 18, forms the curved path 65A. It is noted in the present embodiment that, while the first path member 19 is formed to have the ribs 37, the plane defining the curved path 65A on the outer side is virtually formed by the protruded edges of the ribs 37; however, if the first path member 19 is formed to have no ribs 37, the plane defining the curved path 65A on the outer side corresponds to the inner surface of the first path member 19.

As depicted in FIGS. 10A-10B, the plurality of ribs 37 includes ribs 37A and ribs 37B. The ribs 37B are formed to be smaller in a protruded amount thereof from the front face of the base 91 than the ribs 374. The ribs 37A are formed in a widthwise central area of the first path member 19 along the widthwise direction 9. The ribs 37B are formed in lateral areas of the first path member 19 along the widthwise direction 9 on outer sides of the central area.

In the first path member 19, a first area being the widthwise central area, in which the ribs 37A are formed, coincides with a widthwise range A1 along the widthwise direction 9. In the first area, a first distance L1 is reserved between the plane defining the inner outline of the curve of the curved path 65A and the rear face of the second path member 18 along a direction orthogonal to the conveying flow 16 (see FIG. 7). Meanwhile, second areas being the lateral areas, in which the ribs 37B are formed, coincide with widthwise ranges A2 along the widthwise direction 9. In the second areas, a second distance L2 is reserved between the plane defining the inner outline of the curve of the curved path 65A and the rear face of the second path member 18 along the direction orthogonal to the conveying flow 16 (see FIG. 8). Thus, the first path member 19 provides the first area and the second area in the plane defining the outer outline of the curve of the curved path 65A.

Figure 4:
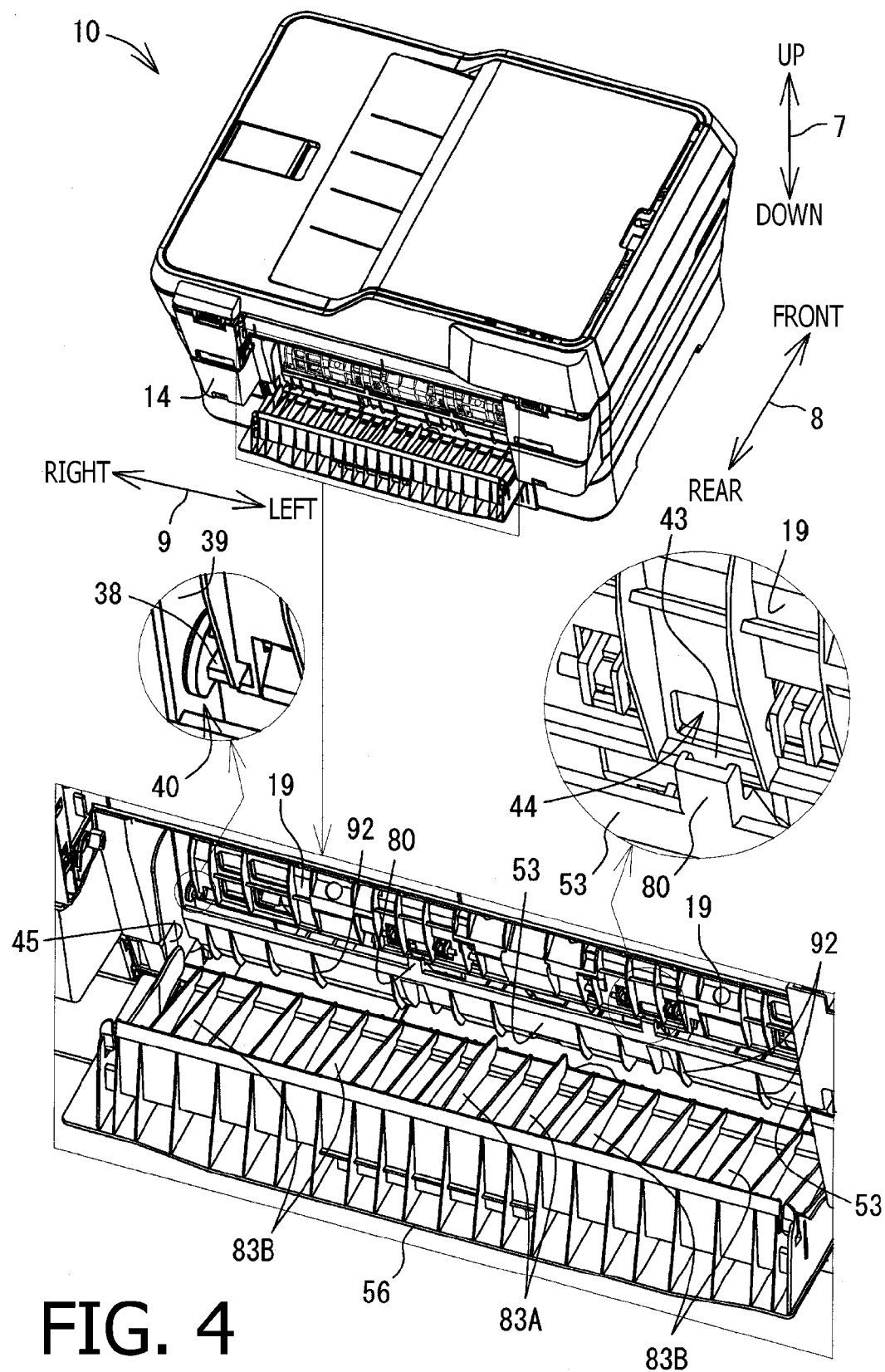
FIG. 4 is a perspective view and partly enlarged views of the MFP 10 according to the embodiment of the present invention with a first path member 19 being in a first position and a third path member 56 being in an open position.
Figure 5:
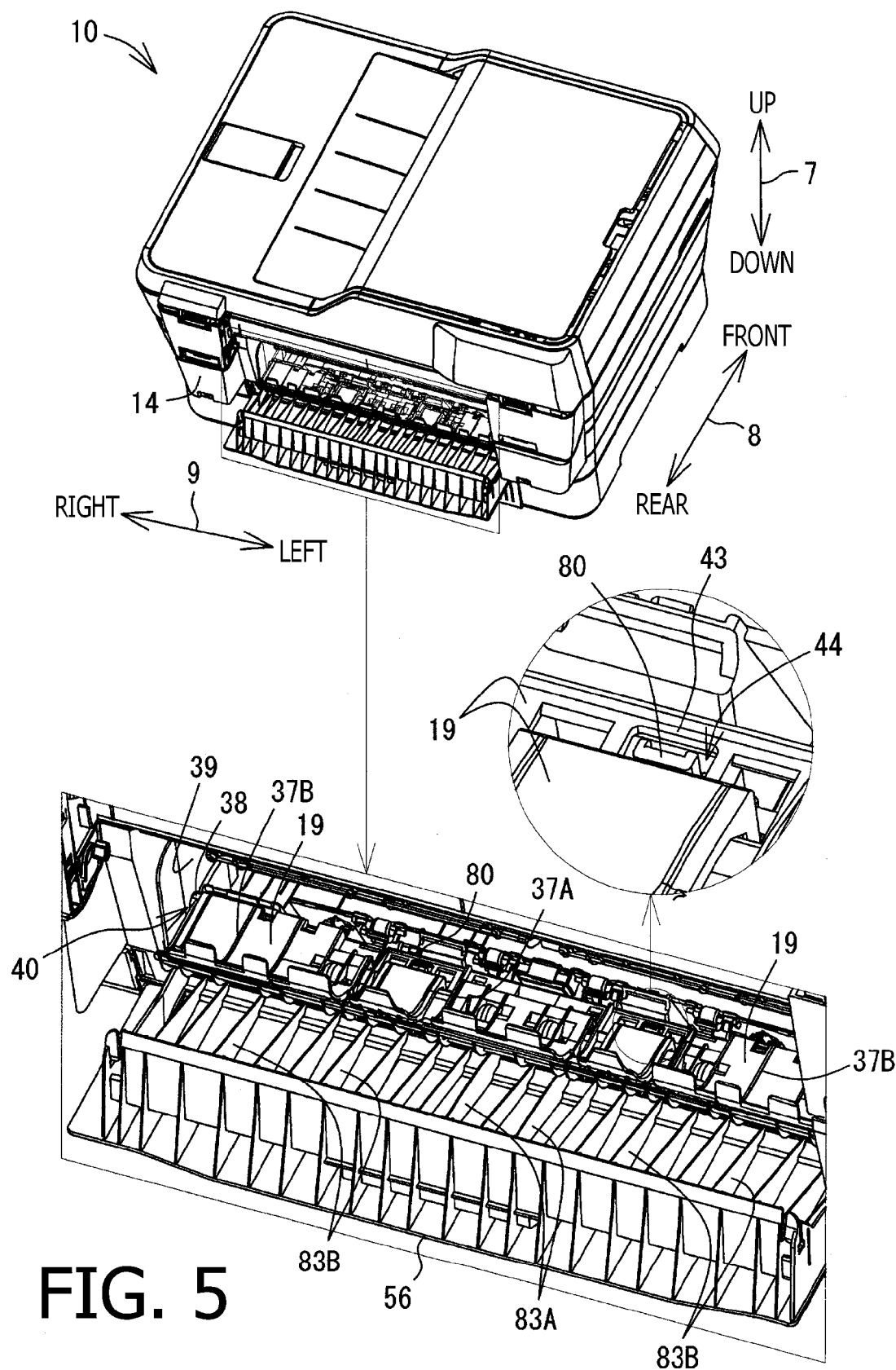
FIG. 5 is a perspective view and partly enlarged views of the MFP 10 according to the embodiment of the present invention with the first path member 19 being in a second position and the third path member 56 being in the open position.
Figure 6:
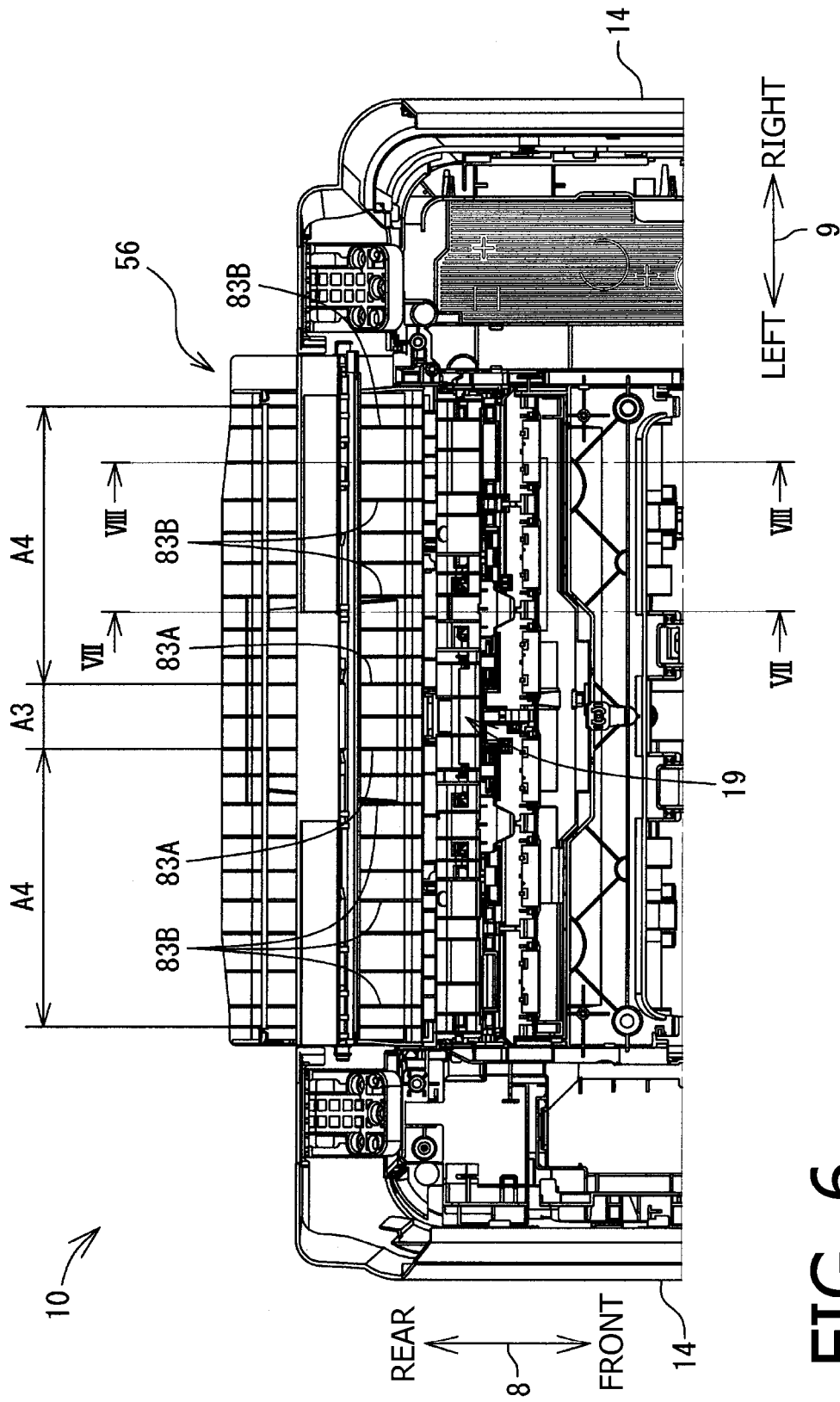
FIG. 6 is a plane view of a lower and rear side of the MFP 10 according to the embodiment of the present invention.

The first path member 19 is formed to have the paired protrusions 38, which protrude outwardly along the widthwise direction 9 from widthwise ends of a lower end of the first path member 19, i.e., an upstream end of the first path member 19 according to the conveying flow 16. Meanwhile, in the frame 39 constituting a part of the housing 14, openings 40 are formed in positions to coincide with the protrusions 38 of the first path member 19 along the widthwise direction 9 (see FIGS. 4 and 5). The frame 39 includes paired parts, which are arranged in rear end positions within the housing 14 to be spaced apart from each other for a predetermined distance (e.g., a distance substantially longer than a width of the first path member 19) along the widthwise direction 9 therebetween. The protrusions 38 are inserted in the openings 40 formed in the paired parts in the frame 39 respectively. The protrusions 38 are formed on an axis extending along the widthwise direction 9. Thus, the first path member 19 is rotatable between a first position, which is indicated by a solid line in FIG. 2 and as shown in FIG. 4, and a second position, which is indicated by a broken line in FIG. 2 and as shown in FIG. 5. When the first path member 19 is in the first position, a position of the downstream end of the first path member 19 according to the conveying flow 16, i.e., an upper-front end of the first path member 19, is defined by a frame (not shown) so that a predetermined distance is maintained in between the first path member 19 in the first position and the second path member 18.

Thus, the frame 39 provides planes, in which the openings 40 are formed, and rotatably support the first path member 19 at the widthwise ends of the first path member 19. Meanwhile, the paired protrusions 38 serve as a rotation axis for the first path member 19.

When the first path member 19 is in the first position, the first path member 19 and the second path member 18 face each other along the direction orthogonal to the conveying flow 16 maintaining a predetermined distance to guide the recording sheet 12 in there-between. Thus, the first path member 19 in the first position, in conjunction with the second path member 18, forms the curved path 65A. When the first path member 19 is in the second position, the first path member 19 is spaced apart farther from the second path member 18 than the first path member 19 in the first position. In this regard, the curved path 65A is exposed to the outside, if a third path member 56, which will be described later, is in an open position. More specifically, the downstream part of the first path member 19, according to the conveying flow 16, is separated apart from the second path member 18 to expose a part of the curved path 65A. Therefore, when the recording sheet 12 is jammed in the curved path 65A, a user of the MFP 10 can rotate the first path member 19 from the first position to the second position and remove the jammed recording sheet 12 through the exposed part of the curved path 65A.

[Outer-Side Support 80]

As depicted in FIGS. 7 and 8, an auxiliary path member 53 is disposed in a lower position with respect to the first path member 19. The auxiliary path member 53 is supported by a frame 41, which constitutes a part of the housing 14 and is disposed in a position between the first feeder tray 20 and the second feeder tray 22 along the vertical direction 7. Thus, the auxiliary path member 53 is disposed on the housing 14. The auxiliary path member 53 is arranged to extend along the widthwise direction 9 (see FIG. 4). A rear face of the auxiliary path member 53 defines an inner outline of curve of the auxiliary conveyer path 66 at a lower position with respect to the rear face of the first path member 19.

As depicted in FIGS. 4 and 7, an outer-side support 80 is formed on an upper end of the auxiliary path member 53 and in adjacent to a lower end of the first path member 19. The outer-side support 80 includes a plurality of (e.g., two) outer-side supporting parts. The outer-side support 80 is a protrusion protruding upward. Thus, in the present embodiment, two outer-side supports 80 are disposed on the housing 14. The outer-side supports 80 are arranged to be spaced apart from each other along the widthwise direction 9. A quantity of the outer-side supports 80 may not necessarily be two but may be three or more.

The outer-side support 80 is formed in a leftward position with respect to the opening 40 formed in one of the paired parts of the frame 39 on the right-hand side and in a rightward position with respect to the opening 40 formed in the other of the paired parts of the frame 39 on the left-hand side along the widthwise direction 9. The outer-side support 80 is formed in a rearward position with respect to the first path member 19 along the front-rear direction 8. The outer-side support 80 is in contact with the rear face of the first path member 19 to support the first path member 19 from the rear. Thus, the outer-side support 80 supports the first path member 19 in an inward position with respect to the openings 40 along the widthwise direction 9. At the same time, the outer-side support 80 supports the first path member 19 at a side opposite from the side facing the curved path 65A.

The outer-side support 80 contacts the rear face of the first path member 19 within an area coincident with the range A1 along the widthwise direction 9. Thus, the outer-side support 80 supports the first area of the first path member 19. In other words, the two outer-side supports 80 are arranged in inward positions with respect to the area, in which the ribs 37A are formed, in the first path member 19. More specifically, the two outer-side supports 80 are arranged in rightward positions with respect to a leftmost one of the ribs 37A in the first path member 19 and in leftward positions with respect to a rightmost one of the ribs 37A in the first path member 19 along the widthwise direction 9.

The outer-side support 80 contacts the lower end of the rear face of the first path member 19. As mentioned above, the paired protrusions 38 serving as the rotation axis of the first path member 19 are formed on the lower end of the first path member 19. Therefore, the lower end of the first path member 19 coincides with the rotation axis of the first path member 19. Meanwhile, at the lower end of the first path member 19, a contact portion 43 to contact the outer-side support 80 is formed. Thus, the first path member 19 includes the contact portion 43, which coincides with the rotation axis of the first path member 19. The contact portion 43 is arranged in a rightward position with respect to the leftmost one of the ribs 37A in the first path member 19 and in a leftward position with respect to the rightmost one of the ribs 37A in the first path member 19 along the widthwise direction 9.

The outer-side support 80 is arranged in the position to contact the rear face of the first path member 19 regardless of presence or absence of the recording sheet 12 in the curved path 65A. In other words, the outer-side support 80 is arranged to contact the first path member 19 when no recording sheet 12 is in the curved path 65A. Therefore, when the recording sheet 12 enters the curved path 65A, and even when the recording sheet 12 tends to urge the front face of the first path member 19 rearward, with the outer-side support 80 contacting the rear face of the first path member 19, the first path member 19 is prevented from bowing by the outer-side support 80. Thus, the outer-side support 80 maintains the contact with the first path member 19 when the MFP 10 is in a first condition, in which the recording sheet 12 is present in the curved path 65A, and when the MFP 10 is in a second condition, in which the recording sheet 12 is absent from the curved path 65A.

As depicted in FIG. 4, the outer-side support 80 extends upward to protrude with respect to the contact portion 43 of the first path member 19. i.e., toward the downstream according to the conveying flow 16. In other words, the outer-side support 80 extends to the downstream side along the conveying flow 16 with respect to a contact position, in which the outer-side support 80 contacts the first path member 19.

Meanwhile, the first path member 19 is formed to have an opening 44. The opening 44 is formed in an upper position with respect to the contact portion 43, i.e., in a downstream position along the conveying flow 16 with respect to the contact position for the outer-side support 80 and the first path member 19. The opening 44 is formed in a position, in which the first path member 19 faces the outer-side support 80 along the front-rear direction 8 when the first path member 19 is in the first position. More specifically; the opening 44 is formed in a position to coincide with an upper part of the contact portion 43 of the outer-side support 80 along the front-rear direction 8.

The opening 44 is formed in the first path member 19 in a position, which coincides with an area occupied by the outer-side support 80 when the first path member 19 rotates in between the first position and the second position. In other words, the opening 44 is formed in a part of the first path member 19, which would otherwise interfere with the outer-side support 80. Therefore, the opening 44 is formed in a substantial size, which allows the outer-side support 80 to penetrate through the first path member 19 when the first path member 19 is rotated in between the first position and the second position.

With the opening 44 formed in the first path member 19, when the first path member 19 in the first position (see FIG. 4) is rotated to the second position (FIG. 5), the outer-side support 80 penetrates the opening 44. In this regard, when the first path member 19 is in the second position, as depicted in FIG. 5, a protruded end of the outer-side support 80 is exposed to an upper side of the first path member 19 through the opening 44.

[Third Path Member 56]

As depicted in FIG. 2, the third path member 56 is arranged to extend to be longer along the vertical direction 7 and the widthwise direction 9 than the front-rear direction 8 in a rearward position with respect to the first path member 19 to face the first path member 19 along the front-rear direction 8. In other words, when the third path member 56 is installed in the MFP 10, the third path member 56 is longer in a height and a width thereof than a depth thereof, and the third path member 56 is disposed in an outer-side position with respect to the first path member 19 along the front-rear direction 8. The third path member 56 is rotatably supported by a frame 45 (see FIG. 4), which constitutes a part of the housing 14. Thus, the third path member 56 is supported by the housing 14 at the position opposite from the second path member 18 with respect to the first path member 19 and at the position to face the first path member 19. Rotatable configuration of the third path member 56 will be described later in detail.

As depicted in FIGS. 9A-9B, the third path member 56 includes a flat-shaped base 81, a paired lateral parts 82 protruding frontward from lateral ends of the base 81, a plurality of ribs 83 protruding frontward from a front face of the base 81 along a range between the paired lateral parts 82, and paired protrusions 84, each of which protrudes from one of the paired lateral parts 82 along the widthwise direction 9. The paired protrusions 84 are formed in the third path member 56 in a lower position along the vertical direction 7 and in an upstream position according to the conveying flow 17. The plurality of ribs 83 contact the recording sheet 12 being conveyed along the auxiliary conveyer path 66 and guide the recording sheet 12, The plurality of ribs 83 are formed to be spaced apart from one another along the widthwise direction 9. A protruded edge of each rib 83 extends along the conveying flow 17. In other words, an upstream part of the protruded edge of each rib 83, according to the conveying flow 17, extends substantially along the vertical direction 7, while a downstream part of the protruded edge of each rib 83, according to the conveying flow 17, is curved frontward.

Meanwhile, the plurality of ribs 92 (see FIGS. 10A-10B) are formed in the first path member 19 to be spaced apart from one another along the widthwise direction 9. A protruded edge of each rib 92 extends along the conveying flow 17. In other words, an upstream part of the protruded edge of each rib 92, according to the conveying flow 17, extends substantially along the vertical direction 7, while a downstream part of the protruded edge of each rib 92, according to the conveying flow 17, is curved frontward.

A virtual plane spreading on the protruded edges of the plurality of ribs 83 defines an outline of the curve of the auxiliary conveyer path 66 on an outer side. Meanwhile, a plane including the protruded edges of the plurality of ribs 92 in the first path member 19 defines an outline of the curve of the auxiliary conveyer path 66 on an inner side. In other words, the third path member 56, in conjunction with the first path member 19, forms the auxiliary conveyer path 66. It is noted in the present embodiment that, while the third path member 56 is formed to have the ribs 83 on the inner face and the first path member 19 is formed to have the ribs 92 on the outer face, the planes defining the auxiliary conveyer path 66 is virtually formed by the protruded edges of the ribs 83, 92; however, if the third path member 56 and the first path member 19 are formed to have no ribs 83, 92, the planes defining the auxiliary conveyer path 66 correspond to the inner and outer surfaces of the third path member 56 and the first path member 19 respectively.

The plurality of ribs 83 includes ribs 83A and ribs 83B. The ribs 83B are formed to be smaller in protruded amount thereof from the front face of the base 81 than the ribs 83A. The ribs 83A are formed in a widthwise central area of the third path member 56 along the widthwise direction 9. The ribs 83B are formed in lateral areas of the third path member 56 along the widthwise direction 9 on outer sides of the central area. The protruded amount of the ribs 83A from the base 81 is greater than the protruded amount of the ribs 83B, In the third path member 56, a third area being the widthwise central area, in which the ribs 83A are formed, coincides with a widthwise range A3 along the widthwise direction 9 (see FIG. 6). In the third area, a third distance L3 (not shown) is reserved between the plane defining the outer outline of the curve of the auxiliary conveyer path 66 and the plane defining the inner outline of the curve of the auxiliary conveyer path 66 along a direction orthogonal to the conveying flow 17. Meanwhile, fourth areas being the lateral areas, in which the ribs 83B are formed, coincide with a widthwise range A4 along the widthwise direction 9 (see FIG. 6). In the second areas, a fourth distance L4 (now shown) is reserved between the plane of the third path member 56 defining the outer outline of the curve of the auxiliary conveyer path 66 and the plane of the first path member 19 defining the inner outline of the curve of the auxiliary path 66 along the direction orthogonal to the conveying flow 16. In this regard, the fourth distance L4 is greater than the third distance L3. Thus, the third path member 56 provides the third area and the fourth area in the plane defining the outer outline of the curve of the auxiliary path 66.

The ribs 83A are thrilled in leftward positions with respect to one of the outer-side supports 80 arranged on the right-hand side and in rightward positions with respect to the other of the outer-side supports 80 arranged on the left-hand side along the widthwise direction 9. In other words, the outer-side supports 80 are arranged in positions to face the fourth area of the third path member 56. Thus, the outer-side support 80 supports the first path member 19 at a part facing the fourth area of the third path member 56.

Figure 3:
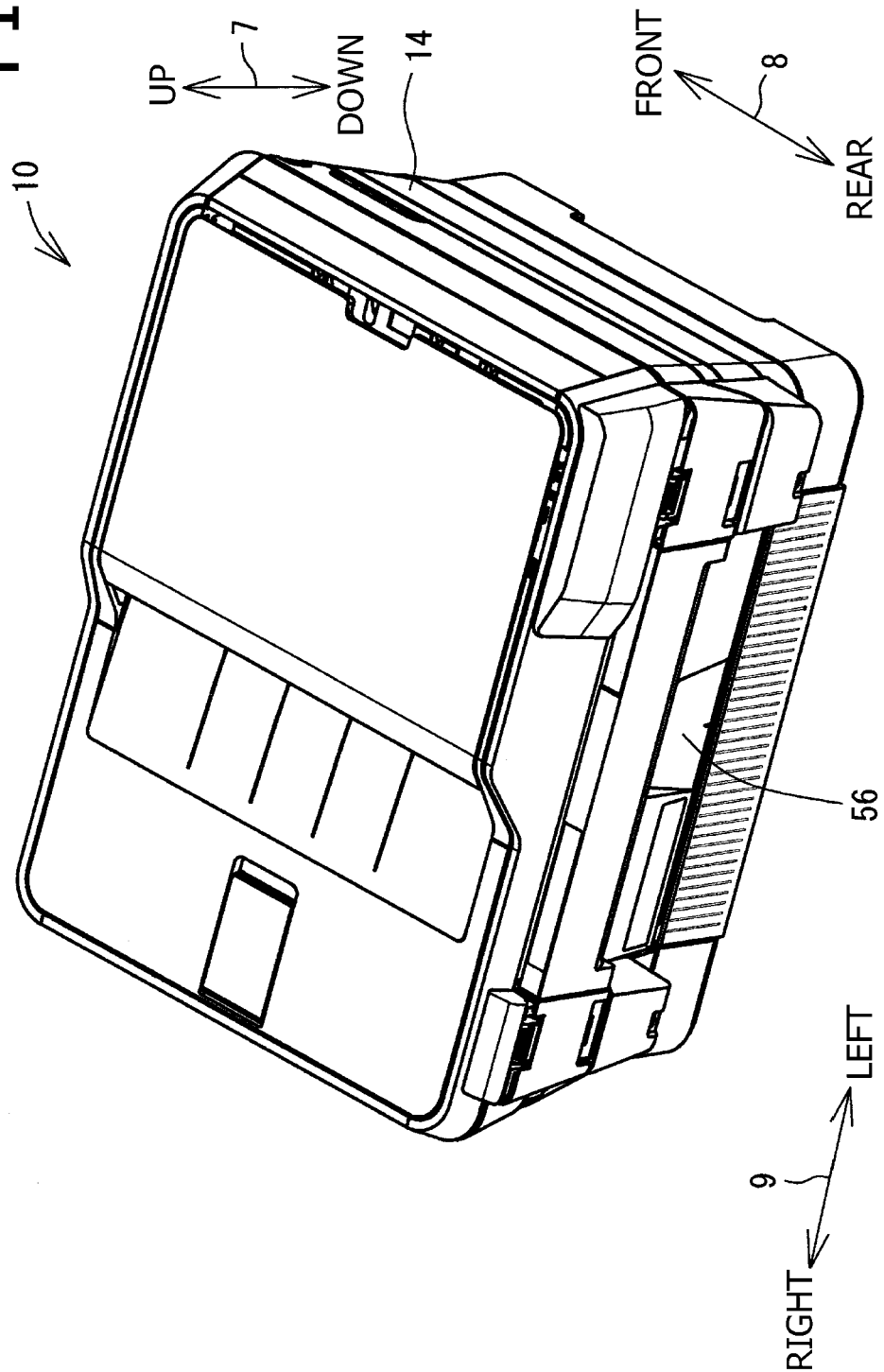
FIG. 3 is a perspective view of the MFP 10 according to the embodiment of the present invention showing rear, left and upper sides of the MFP 10.

The third path member 56 is formed to have the paired protrusions 84, which protrude outwardly along the widthwise direction 9 from widthwise ends of a lower end of the third path member 56, i.e., an upstream end of the third path member 56 according to the conveying flow 17. Meanwhile, in the frame 45 constituting a part of the housing 14, openings (not shown) are formed in positions to coincide with the protrusions 84 of the third path member 56 along the widthwise direction 9 (see FIG. 4). The frame 45 includes paired parts, which are arranged in rearward positions with respect to the frame 39 to be spaced apart from each other for a predetermined distance (e.g., a distance substantially longer than a width of the third path member 56) along the widthwise direction 9 there-between. The protrusions 84 are inserted in the openings formed in the paired parts in the frame 45 respectively. The protrusions 84 are formed on an axis extending along the widthwise direction 9. Thus, the third path member 56 is rotatable between a closed, position, which is indicated by a solid line in FIG. 2 and as shown in FIG. 3, and an open position, which is indicated by a broken line in FIG. 2 and as shown in FIGS. 4 and 5. When the third path member 56 is in the closed position, a position of a downstream end of the third path member 56 along the conveying flow 17, i.e., an upper-front end of the third path member 56, is defined by a frame (not shown) so that a predetermined distance is maintained in between the third path member 56 in the closed position and the first path member 19 in the first position.

When the third path member 56 is in the closed position, the front face of the third path member 56 and the rear face of the first path member 19 face each other while the predetermined distance to guide the recording sheet 12 is maintained in there-between. Thus, the third path member 56 in the closed position, in conjunction with the first path member 19, forms the auxiliary conveyer path 66. Meanwhile, when the third path member 56 is in the open position, the auxiliary conveyer path 66 is exposed to the outside. Therefore, when the recording sheet 12 is jammed in the auxiliary conveyer path 66, a user of the MFP 10 can rotate the third path member 56 from the closed position to the open position and remove the jammed recording sheet 12 through the exposed part of the auxiliary conveyer path 66.

[Usability]

According to the embodiment described above, the first path member 19 is arranged on the outer side of the curve of the housing 14. Meanwhile, the curved path 65A formed by the first path member 19 and the second path member 18 is curved. Therefore, the recording sheet 12 being conveyed along the curved path 65A tends to be urged against the first path member 19 on the outer side of the curve, and the first path member 19 may tend to be deformed outward from the outer side position. However, according to the present embodiment, the outer-side support 80 abuts the first path member 19, which tends to be deformed. Thereby, the first path member 19 is restricted from being deformed outward. Accordingly, the recording sheet 12 can be conveyed steadily along the curved path 65A, Further, according to the embodiment described above, the first path member 19 is rotatable, which is a preferable configuration to have the first path member 19 movable between the first position and the second position.

According to the embodiment described above, the rotation axis of the first path member 19 is arranged on the upstream position along the conveying flow 16, i.e., on the lower end of the first path member 19. Therefore, the first path member 19 is rotatable from the first position to the second position by the own weight of the first path member 19. Accordingly, the recording sheet 12 jammed in the curved path 65A can be easily removed.

According to the embodiment described above, the contact portion 43 coincides with the rotation axis of the first path member 19; therefore, the first path member 19 can be prevented from conflicting with the outer-side support 80, which is in contact with the contact portion 43 when rotating.

According to the embodiment described above, the outer-side support 80 abuts the first path member 19 at the contact position; thereby, the first path member 19 can be restricted from being deformed. Further, according to the embodiment described above, when the first path member 19 rotates between the first position and the second position, the outer-side support 80 penetrates the opening 44 and is prevented from conflicting with the first path member 19. Accordingly, rotation of the first path member 19 can be prevented from being interfered with by the outer-side support 80.

In the curved path 65A, if the distance between the first path member 19 and the second path member 18 is shorter, the recording sheet 12 may tend to be urged against the first path member 19 easily. According to the embodiment described above, meanwhile, the outer-side support 80 supports the first path member 19 at the first area corresponding to the part of the curved path 65A, wherein the distance between the first path member 19 and the second path member 18 is shorter. Therefore, the first path member 19 can be restricted from being deformed effectively.

According to the embodiment described above, the outer-side support 80 is in contact with the first path member 19 regardless of the presence or absence of the recording sheet 12 in the curved path 65A; therefore, an amount of outward deformation of the first path member 19 can be restricted to be smaller at all times.

According to the embodiment described above, a plurality of outer-side supports 80 are arranged along the widthwise direction 9; therefore, outward deformation of the first path member 19 in a greater widthwise range along the widthwise direction 9 can be restricted.

According to the embodiment described above, the curved path 65A is curved in the shape to invert the recording sheet 12 upside-down from the posture of being laid in the first feeder tray 20. Therefore, the recording sheet 12 having been conveyed to the curved path 65A tends to be urged against the first path member 19 disposed on the outer side of the curve. Meanwhile, the conveyer roller 60 can perform the registration control to correct skew of the recording sheet 12 by being rotated in the reverse rotating direction, which is opposite from the rotation to convey the recording sheet 12 in the conveying flow 16. After the registration control, the recording sheet 12 tends to be urged to the first path member 19 even more intensively. However, according to the present embodiment, outward deformation of the first path member 19 is restricted. Thus, the present embodiment provides a preferable configuration to convey the recording sheet 12 correctly.

According to the embodiment described above, the auxiliary conveyer path 66 is formed on the outer side of the curve of the first path member 19 in the housing 14. Therefore, outer-side support 80 disposed on the outer side of the curve of the first path member 19 faces the auxiliary conveyer path 66. Meanwhile, according to the embodiment described above, the outer-side support 80 supports the first path member 19 at the part facing the fourth area of the third path member 56. In this regard, within the fourth area, the distance between the first path member 19 and the third path member 56 is greater than the distance between the first path member 19 and the third path member 56 in the other area of the third path member 56. Therefore, according to the embodiment described above, it is less likely that conveyance of the recording sheet 12 is interfered with by the outer-side support 80 facing the auxiliary conveyer path 66.

Although an example of carrying out the invention has been described, those skilled in the art will appreciate that there are numerous variations and permutations of the conveyer device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

[Variation 1]

For example, the first path member 19 may not necessarily be moved between the first position and the second position by rotating but may be moved between the first position and the second position by a different act of moving. For example, the first path member 19 may be slidably moved between the first position and the second position along the front-rear direction 8. For another example, the first path member 19 may be removable from the housing 14: the first path member 19 may be movable from the first position to the second position by being removed from the housing 14 and may be movable from the second position to the first position by being attached to the housing 11. Further, the third path member 56 may be, optionally or additionally to the first path member 19, movable between the closed position and the open position by an act of moving different from rotating.

[Variation 2]

For another example, the outer-side support 80 may not necessarily be in contact with the first path member 19 at all times, including the first condition, in which the recording sheet 12 is present in the curved path 65A, and the second condition, in which the recording sheet 12 is absent from the curved path 65A. That is, the outer-side support 80 may not necessarily be in contact with the first path member 19 in the second condition. In this regard, the outer-side support 80 may contact the first path member 19 when the first path member 19 is urged against by the recording sheet 12 in the curved path 65A and tends to be bowed rearward toward the outer side of the curve. An amount of clearance to be reserved in between the first conveyer path 19 and the outer-side support 80 in the second condition may be determined depending on a bowing behavior of the first path member 19.

According to the above configuration, the outer-side support 80 may not necessarily be arranged to be in contact with the first path member 19 when the first path member 19 is not deformed. Therefore, a wider range of layout options for the outer-side support 80 may be available.

[Variation 3]

For another example, paired auxiliary conveyer rollers 59 to convey the recording sheet 12 in the conveying flow 17 may be disposed in the auxiliary conveyer path 66 (see FIG. 2). Each of the paired auxiliary conveyer rollers 59 may include an auxiliary conveyer roller 67 and an auxiliary pinch roller 68,

[Variation 4]

For another example, the outer-side support 80 may not necessarily include a plurality of outer-side supports 80 but may be a single piece of outer-side support 80.

[Variation 5]

For another example, according to the embodiment described above, the distance between the first path member 19 and the second path member 18 along the direction orthogonal to the conveying flow 16 includes the first distance L1 and the second distance L2, and the first distance L1 and the second distance L2 are partitioned at a border of the first area and the second area. However, a range containing the first distance L1 and a range containing the second distance L2 may not necessarily be distinctly partitioned but may transition one to another gradually. In other words, for example, the ribs 37 formed in outward positions along the widthwise direction 9 of the first path member 19 may be formed to be smaller in protrusive amount thereof than the protrusive amount of the ribs 37 formed in central positions along the widthwise direction 9 so that the protrusive amounts may vary gradually along the widthwise direction 9 to be greatest at the central position.

[Variation 6]

For another example, according to the embodiment described above, the distance between the third path member 56 and the first path member 19 along the direction orthogonal to the conveying flow 17 includes the third distance L3 and the fourth distance L4, and the third distance L3 and the fourth distance L4 are partitioned at a border of the third area and the fourth area. However, a range containing the third distance L3 and a range containing the fourth distance L4 may not necessarily be distinctly partitioned but may transition one to another gradually. In other words, for example, the ribs 38 formed in outward positions along the widthwise direction 9 of the third path member 56 may be formed to be greater in protrusive amount thereof than the protrusive amount of the ribs 38 formed in central positions along the widthwise direction 9 so that the protrusive amounts may vary gradually along the widthwise direction 9 to be greatest at the central position.

What is claimed is:

1. A conveyer device, comprising:
   a body;
   a first path member supported by the body, the first path member including a first side and a second side, the first path member forming a part of conveyer path, which is curved at least partially, and along which a sheet is conveyed, from an upstream toward a downstream according to a conveying flow;
   a second path member supported by the body, the second path member being arranged on an inner side of a curve of the conveyer path to face the first path member, the second path member forming a part of the conveyer path,
   a first supporting part arranged in the body and configured to support the first path member at a widthwise end of the first path member along a widthwise direction, which intersects with the conveying flow of the sheet being conveyed along the conveyer path; and
   a second supporting part arranged in the body and configured to support the first path member from an outer side of the curve of the conveyer path, the outer side being a side opposite from the second path member at a widthwise inner-side position along the widthwise direction with respect to the first supporting part, the second supporting part extending from a contact position, in which the second supporting part contacts the first path member, toward the downstream along the conveying flow;
   wherein the first path member is rotatable between a first position, in which the first path member forms the conveyer path in conjunction with the second path member, and a second position, in which the first path member is separated farther from second path member than the first path member being in the first position;
   wherein the first supporting part supports the first path member rotatably;
   wherein the first side of the first path member faces the second supporting part when the first path member is in the first position, and the second side of the first path member faces the second path member when the first path member is in the first position;
   wherein the first path member is formed to have an opening, the opening formed between the first side and the second side of the first path member and through the first path member in a downstream position along the conveying flow with respect to the contact position and in a position, which coincides with an area occupied by the second supporting part when the first path member rotates in between the first position and the second position;
   wherein the second supporting part penetrates the opening to be exposed to the second side of the first path member when the first path member is in the second position.

2. The conveyer device according to claim 1,
   wherein the conveyer path is curved along the conveying flow of the sheet; wherein a downstream part of the conveyer path along the conveying flow is in an upper position with respect to an upstream part of the conveying path; and
   wherein the first path member comprises a rotation axis, at which the first path member is supported by the first supporting part, in an upstream part of the first path member along the conveying flow.

3. The conveyer device according to claim 1, wherein the first path member comprises a contact portion, which is configured to coincide with a rotation axis of the first path member and to contact the second supporting part of the body.

4. The conveyer device according to claim 1, wherein the first path member comprises a first area, in which a distance between the first path member and the second, path member along a direction orthogonal to the conveying flow is a first distance, and a second area, in which a distance between the first path member and the second path member along the direction orthogonal to the conveying flow is a second distance being greater than the first distance, along the widthwise direction; and
wherein the second supporting part supports the first path member at the first area.

5. The conveyer device according to claim 1, wherein the second, supporting part contacts the first path member in a first condition, in which the sheet is present in the conveyer path, and in a second condition, in which the sheet is absent from the conveyer path.

6. The conveyer device according to claim 1, wherein the second supporting part contacts the first path member when the first path member is deformed outward, toward an outer side of the curve of the conveyer path.

7. The conveyer device according to claim 1, wherein the second supporting part comprises a plurality of parts arranged to be spaced apart from one another along the widthwise direction.

8. The conveyer device according to claim 1, farther comprising: a placement section configured to place the sheet therein;
a feeder roller configured feed the sheet placed in the placement section to the conveyer path; and
a conveyer roller configured to rotate selectively in one of normal and reverse rotating directions and to convey the sheet fed to the conveyer path by the feeder roller along the conveying flow by rotating in one of the normal and reverse rotating directions;
wherein the conveyer path is curved in a shape to invert the sheet fed to the conveyer path from a posture of being laid in the placement section; and
wherein the conveyer roller is arranged in a downstream position along the conveying flow with respect to the curve of the conveyer path.

9. The conveyer device according to claim 1, further comprising:
a third path member supported by the body, the third path member being arranged on an opposite side from the first path member with respect to the first path member to face the first path member, the third path member forming a part of an auxiliary conveyer path in conjunction with the first path member, along which the sheet is conveyed from an upstream toward a downstream according to an auxiliary conveying flow;
wherein the third path member comprises a third area, in which a distance between the first path member and the third path member along a direction orthogonal to the auxiliary conveying flow is a third distance, and a fourth area, in which a distance between the first path member and the third path member along the direction orthogonal to the auxiliary conveying flow is a fourth distance being greater than the third distance, along the widthwise direction; and
wherein the second supporting part supports the first path member at a part facing the fourth area.

10. The conveyer device according to claim 9, further comprising:
a second placement section configured to place the sheet therein: a second feeder roller configured feed the sheet placed in the second placement section to the auxiliary conveyer path; and
a second conveyer roller configured to rotate selectively in one of normal and reverse rotating directions and to convey the sheet fed to the auxiliary conveyer path by the second feeder roller along the auxiliary conveying flow by rotating in one of the normal and reverse rotating directions;
wherein the auxiliary conveyer path is curved in a shape to invert the sheet fed to the auxiliary conveyer path from a posture of being laid in the second placement section; and
wherein the second conveyer roller is arranged in an upstream position along the auxiliary conveying flow with respect to the curve of the auxiliary conveyer path.

11. An image recording apparatus, comprising: a body;
a conveyer device comprising:
a first path member supported by the body, the first path member including a first side and a second side, the first path member forming a part of conveyer path, which is curved at least partially, and along which a sheet is conveyed from an upstream toward a downstream according to a conveying flow;
a second path member supported by the body, the second path member being arranged on an inner side of a curve of the conveyer path to face the first path member, the second path member forming a part of the conveyer path;
a first supporting part arranged in the body and configured to support the first path member at a widthwise end of the first path member along a widthwise direction, which intersects with the conveying flow of the sheet being conveyed along the conveyer path; and
a second supporting part arranged in the body and configured to support the first path member from an outer side of the curve of the conveyer path, the outer side being a side opposite from the second path member at a widthwise inner-side position along the widthwise direction with respect to the first supporting part, the second supporting part extending from a contact position, in which the second supporting part contacts the first path member, toward the downstream along the conveying flow;
an image recording unit configured to record an image on the sheet being conveyed along the conveyer path,
wherein the first path member is rotatable between a first position, in which the first path member forms the conveyer path in conjunction with the second, path member, and a second position, in which the first path member is separated farther from second path member than the first path member being in the first position;
wherein the first supporting part supports the first path member rotatably;
wherein the first side of the first path member faces the second support part when the first path member is in the first position, and the second side of the first path member faces the second path member when the first path member is in the first position;

wherein the first path member is formed to have an opening, the opening formed between the first side and the second side of the first path member and through the first path member in a downstream position along the conveying flow with respect to the contact position and in a position, which coincides with an area occupied by the second supporting part when the first path member rotates in between the first position and the second position;

wherein the second supporting part penetrates the opening to be exposed to the second side of the first path member when the first path member is in the second position.

* * * * *